United States Patent [19]

Mohon

[11] 4,072,395

[45] Feb. 7, 1978

[54] MICROSCOPE

[75] Inventor: Windell N. Mohon, Winter Park, Fla.

[73] Assignee: The United States of America as represented by the Secretary of the Navy, Washington, D.C.

[21] Appl. No.: 689,015

[22] Filed: May 24, 1976

[51] Int. Cl.[2] .................................... G02B 21/00
[52] U.S. Cl. ................................ 350/33; 350/3.72; 350/42; 350/87
[58] Field of Search .................. 350/3.5, 25, 31, 33, 350/35, 36, 40, 42, 87

[56] References Cited

U.S. PATENT DOCUMENTS

| 3,453,035 | 7/1969 | Walther | 350/162 R X |
| 3,575,485 | 4/1971 | Van Buskirk | 350/3.5 |
| 3,580,655 | 5/1971 | Leith et al. | 350/3.5 |
| 3,609,027 | 9/1971 | Lowenthal | 350/3.5 |

FOREIGN PATENT DOCUMENTS 1,217,099  5/1966  Germany ............................ 350/33

OTHER PUBLICATIONS

Kingslake, *Applied Optics and Optical Engineering*, vol. IV, pp. 36–37, Academic Press, N. Y., 1967.
Sincerbox, "Formation of Optical Elements by Holography" *IBM Tech. Discl. Bull.*, vol. 10, No. 3, pp. 267–268, Aug. 1967.
Schwar et al., "Point Holograms as Optical Elements," *Nature*, vol. 215, pp. 239–241, July 1967.

*Primary Examiner*—John K. Corbin
*Assistant Examiner*—Matthew W. Koren
*Attorney, Agent, or Firm*—Richard S. Sciascia; Don D. Doty

[57] ABSTRACT

A microscope is disclosed as incorporating a light source which broadcasts light in succession through a holographic condenser lens, a transparent object support stage, an object to be magnified, a holographic objective lens, a holographic zoom lens assembly, a combination holographic redirector and magnifier lens, and a holographic eyepiece lens which may or may not be located on the same observational axis as the aforesaid holographic lenses. Said holographic eyepiece lens is constructed sufficiently large to accommodate the two eyes of a human observer at the same time, thereby providing binocular vision characteristics by a single lens. The aforementioned lenses associated therewith are also constructed to be optically complementary with said holographic eyepiece lens, so as to permit the latter to be used as a monocular lens.

26 Claims, 8 Drawing Figures

MICROSCOPE

FIELD OF THE INVENTION

The present invention, in general, relates to optical imaging systems and, in particular, is an optical magnification system for viewing objects that would otherwise be difficult or impossible to see with the naked eye. In even greater particularity, the subject invention is an improved microscope incorporating holographic lenses and a single viewing aperture that is sufficiently large to accommodate both eyes of a human observer.

DESCRIPTION OF THE PRIOR ART

Heretofore, numerous types of microscopes have been employed to magnify small objects to such size as would permit their being seen by the human eye. For the most part, however, such prior art microscopes have used glass or plastic refractive lenses arranged in various and sundry manners that produce the desired magnification effect. One such prior art microscope, which uses glass lenses, is disclosed by Rudolf Kingslake at page 4 of Volume 4 of Applied Optics and Optical Engineering, published by Academic Press, New York, New York, in 1967. Disclosed thereby is an optical image magnification system comprising, in properly oriented disposition, an illuminator means, a mirror, a condenser lens assembly, a sample support with a slide sample mounted thereon, an objective lens assembly, a fixed position zoom lens, a cam operated zoom lens arrangement, an inclination prism, a binocular beam divider assembly, and an eyepiece assembly containing a pair of separate eyepieces. According to the aforementioned author, the optical relay system defined above represents an improved development in compound microscope design, ostensively because it serves as both a relay system and a power changer or zoom system, with the total magnification thereof being equal to the product of the objective magnification times the relay magnification times the eyepiece magnification.

Obviously, there are many other prior art microscopes which could be discussed herein; however, for the sake of brevity, they will not be mentioned further at this time, inasmuch as the artisans would certainly be aware of them, the aforementioned one is quite representative, and the fact that, for the most part, they contain glass lenses arranged in various geometrically related positions for magnification purposes.

SUMMARY OF THE INVENTION

The instant invention constitutes an improved microscope having a unique inter-related plurality of elements combined in a new and useful manner, with some of said elements being holographic lenses. As a matter of fact, one or more of said holographic lenses may replace all of the glass refractive lenses that would otherwise be included therein as the lens elements thereof, respectively. Such substitution alone appears to effect some improvement and, thus, to be of significance; and when such holographic lenses are uniquely combined with each other and the other components of the invention as defined herein, they ostensively constitute a new combination of elements which is useful, indeed.

Therefore, an object of the invention is to provide an improved microscope.

Another object of the invention is to provide a microscope that is lighter in weight and easier and more economical to manufacture than the microscopes of the prior art containing glass lenses.

Still another object of this invention is to provide an improved microscope that can be readily made to incorporate special functions and features by one skilled in the art right in the laboratory.

A further object of this invention is to provide an improved microscope having one or more dual purpose holographic lenses incorporated therein, thereby effectively reducing the number of lenses required therefor in some instances.

Another object of this invention is to provide an improved method and means for concomitantly directing and magnifying light images in an optical imaging system.

Another object of this invention is to provide a high fidelity microscope having only one optical system for conveying a single image to both of the eyes of an observer (i.e. biocular), rather than a binocular beam divider system and binocular eyepieces, thereby permitting said observer to rotate his head to view the sample being observed from many different angles.

Another object of this invention is to provide a microscope that requires no inclination prism to be incorporated therein, thereby eliminating one complex, heavy, expensive optical element therefrom.

Another object of this invention is to provide a multi-channel microscope that facilitates the teaching of a plurality of students simultaneously by one instructor.

Other objects and many of the attendant advantages of this invention will be readily appreciated as the same becomes better understood by reference to the following detailed description when considered in connection with the accompanying drawings wherein:

DESCRIPTION OF THE PREFERRED EMBODIMENTS

Figures 1, 2:
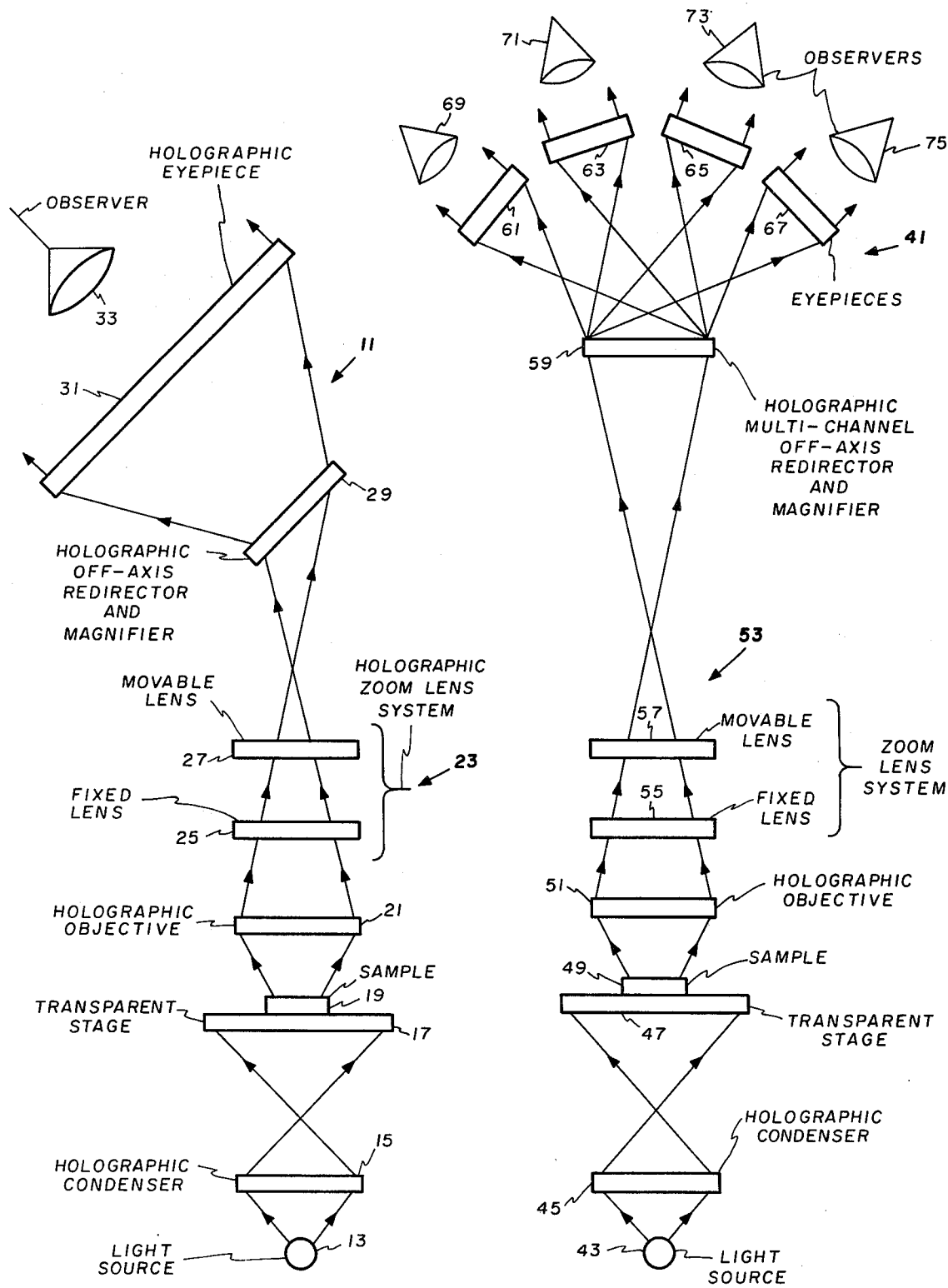
FIG. 1 is a schematic elevational view of a preferred embodiment of the microscope constituting the subject invention.
FIG. 2 is a schematic view of another preferred embodiment of the microscope constituting the subject invention.

Referring now to FIG. 1, there is shown an improved microscope 11 incorporating the invention. Disclosed therein is a lamp or other light source 13, and spatially disposed therefrom is a holographic lens 15 or other lens means which acts as a condenser lens. A position adjustable, transparent stage 17 of suitable geometrical configuration for holding or having mounted thereon a sample 19 to be magnified and observed is likewise spatially disposed from holographic condenser lens 15 along the light path and longitudinal axis of microscope 11. Spatially disposed from transparent platform or stage 17 is a holographic objective lens 21 or other suitable lens means, also centered about the longitudinal axis of the subject microscope. Said objective lens 21 may, of course, include one or more lens elements, depending on the optical arrangement, wavelengths, resolution, and magnification desired. A zoom system 23, comprising holographic fixed and movable lenses 25 and 27, is mounted along the longitudinal axis of the instant microscope in such manner that it may be either stationary or moved therealong as desired. Such zoom system provides a means of continuously varying the total microscope magnification by suitable conventional mechanical apparatus.

Obviously, mechanical zoom implementation apparatus is well known in the optical imaging art; hence, it would be well within the purview of the artisan to select the proper one for incorporation in this invention for the purpose of optimizing the operation thereof during any given operational circumstances, since so doing would be merely a matter of design choice.

Disposed in the light path of the subject microscope — preferably but not necessarily centered along the longitudinal axis thereof — is an off-axis, single channel, holographic lens 29 which should be constructed by conventional holographic construction methods to concomitantly redirect and magnify light images passing therethrough. Hence, in the particular preferred embodiment being discussed, said holographic lens 29 is shown as having been mounted in a slanted disposition, with the plane thereof at some predetermined angle with the aforesaid longitudinal axis of the microscope. However, it should be understood that such disposition thereof is representative only, and that it is intended that the scope of the instant invention be unlimited and, thus, be such as would permit any orientation or disposition of lens 29 that would facilitate the use of the constructed microscope for any desired purpose, including being positioned with the plane thereof normal to the light path within and/or the longitudinal axis of said microscope.

Because holographic lens 29 is an off-axis, single-channel, holographic lens, it, of course, redirects and images light to an eyepiece 31 deployed at any suitable position in the subject microscope, as is evident from the structural representation thereof depicted in FIG. 1. Eyepiece 31, in turn, produces a collimated image which is biocular and, thus, sufficiently large to be viewed or observed simultaneously by both eyes of a human observer 33. Obviously, in order to permit such observation by both eyes of a human being at the same time, eyepiece 31 must have a diameter that is large enough to produce the aforesaid large collimated image, and, in addition, each of the aforementioned holographic lenses 15, 21, 25, 27, and 29 must be large enough to accommodate eyepiece 31, as far as the light images passing through the subject microscope are concerned. Therefore, it may readily be seen that because large diameter lenses are involved in so doing, the incorporation of easily made, readily customized, relatively economically manufactured, light weight, high resolution holographic lenses in the subject invention are definitely preferable and constitute the acquiring of advantages heretofore unavailable from comparable glass or plastic ground lenses. Moreover, due to the light weight characteristic of holographic lenses, the mounting and support structure therefor may be lighter in weight and perhaps made of simple and cheaper materials than would ordinarily be required for the mounting and supporting of ground glass and plastic lenses.

Without limitation, the following characteristics and parameters are listed for the light source and respective lenses of the new and improved microscope of FIG. 1, starting from light source 13 and working in an upward direction, as illustrated:

Lamp 13 is preferably a monochromatic light source (unless each of the single element lenses defined below is actually a compound lens composed of a plurality of elements);

Condensing lens 15 is located 28mm from lamp 13, has a focal length of 20 mm and an aperture of 18 mm;

Stage 17 is located 70 mm from condensing lens 15, has an illuminated area of 25 mm in diameter, and is mechanically adjustable in the $x$ and $y$ axes;

Objective lens 21 is located 11 mm from stage 17, has a focal length of 10 mm and an aperture of 9 mm;

Fixed zoom lens 25 is located 10 mm from objective lens 21, has a focal length of 83.2 mm and an aperture of 10 mm;

Movable zoom lens 27 is located in such manner that its distance will vary a desired distance from a plane located 25 mm from fixed zoom lens 25 (as is conventional in the zoom lens art), has a focal length of −28 mm and an aperture of 10 mm;

Redirecting lens 29 is preferably located at 125 mm from movable zoom lens 25 (but may be varied in both location and angular direction as warranted by operational circumstances), has a focal length of −7.7 mm and an aperture of 5 mm; and Eyepiece 31 is located 140 mm from redirecting lens 29, has a focal length of 148 mm and an aperture of 100 mm.

Using the above dimensions, the subject microscope employing holographic lenses and the zoom feature (which is optional) will have an overall magnification factor of −14.2. Of course, if other suitable dimensions were selected by the artisan, other magnification factors may be obtained. Thus, it would be well within the purview of one skilled in the art having the teachings presented herewith to make whatever dimension selections as would be necessary to customize the subject invention for any appropriate specific use or purpose.

Moreover, if desired, all lenses incorporated in the subject invention may be compound element, color-correcting, holographic lenses.

As is conventional in optical system analysis, the arrowed lines extending between the light source 13 and observer 33 via the optical elements disposed therebetween represent radiant energy — probably in the visual range, but not limited thereto — transmissions, respectively.

The preferred embodiment of the present invention shown in FIG. 2 is a microscope 41 which includes a multi-channel, holographic, off-axis lens that redirects light coming from an object to a plurality of spatially separated eyepieces. As may readily be seen, with the exception of that feature, the microscope of FIG. 2 is substantially similar to that of FIG 1, as far as the number of lenses and the geometrical configuration thereof are concerned. Therefore, for the sake of brevity of disclosure, it will merely be stated that microscope 41 incorporates a lamp or other light source 43, a holographic condenser lens 45, a movable transparent sample support platform or stage 47, a sample 49 (which, of course, includes the object to be magnified and viewed by the observer), a holographic objective lens 51, an adjustable zoom system 53 — including fixed and movable holographic lenses 55 and 57 — all of which function in manners comparable to like lenses depicted in FIG. 1, respectively.

The features which distinguish the microscope of FIG. 2 from the microscope of FIG. 1 will now be discussed in detail.

At some predetermined location that is spatially disposed from the aforementioned holographic zoom lens system 53, and in the light path therefrom, is a holographic multi-channel, off-axis, redirector and magnifier lens 59 which redirects light images to a plurality (in this case, four) of spatially separated eyepieces 61, 63, 65, and 67 which, in turn, are viewed or observed by a like plurality of human observers 69, 71, 73, and 75, each of which has two eyes. Because human eyes are spatially separated, eyepieces 61 through 67 are respectively biocular and, thus, sufficiently large in diameter to accommodate them and, likewise, the other holographic or other lenses associated therewith are of diameters that are compatible with that of the aforesaid eyepieces. Consequently, the object or sample being magnified may be viewed comfortably by two-eyed observers, be they human or otherwise.

Again, as is conventional in optical system analysis, the arrowed lines extending between the various optical elements of the microscope of FIG. 2 represent radiant energy transmissions in the visual or other ranges.

Obviously, in the event the aforementioned observers are other than human beings — such as, for example, radiant energy responsive instruments having binocular responsive elements — energy radiating from an object or sample being magnified may fall into ranges other than the visual ranges or into ranges including visual ranges and one or more other ranges as well.

Like the embodiment of the invention depicted in FIG. 1, the new and improved microscope of FIG. 2 has preferred dimensions between adjacent elements, preferred focal lengths, and preferred apertures for a given application. However, if so desired, said dimensions may be the same as those associated with the microscope of FIG. 1, although it would be obvious from the inspection of FIG. 2 that holographic multi-channel off-axis redirector and magnifier lens 59 is disposed concentrically about the longitudinal axis (not illustrated, but obviously there) thereof within a plane that is preferably — but not necessarily — normal thereto. Futhermore, it may readily be seen that eyepieces 61, 63, 65, and 67 may be of the same dimensions and characteristics as eyepieces 31 or any other that will cause the subject microscope to be optimized for any given operational situation. Therefore, again, it should be understood that the device of FIG. 2 has been disclosed without intent to limit the design selections thereof.

Because microscopes 11 and 41 have both been disclosed in schematic form for the sake of simplicity of disclosure, the housing and mounting means for all of the elements incorporated therein have been omitted, nevertheless, such housing and mounting means are obviously used to construct them as unitary devices, respectively, and in this case, the housing and mounting means therefor should be considered as being those that are ordinarily conventional in the art. Thus, no further explanation thereof is deemed necessary or desirable at this time.

Most or all of the lenses incorporated in the subject invention are conventionally constructed holographic lenses, although in some instances and for some operational purposes, it may be advantageous to combine appropriate holographic lenses and ground glass or plastic lenses. In any event, the holographic lenses may be constructed in any suitable manner — such as those mentioned, suggested, implied, or used in U.S. Pat. No. 3,586,412, entitled Holographic Lens With Aberation Correction, by Emmet N. Leith, U.S. Pat. No. 3,807,829, entitled Extended-Field Holographic Lens Arrays, by Donald H. Close, and/or U.S. Pat. No. 3,941,450, entitled Device for Recording a Matrix of Holographic Lenses, by Huignard et al — as long as they are constructed to produce the desired optical results by means of diffraction rather than by refraction.

Figure 3:
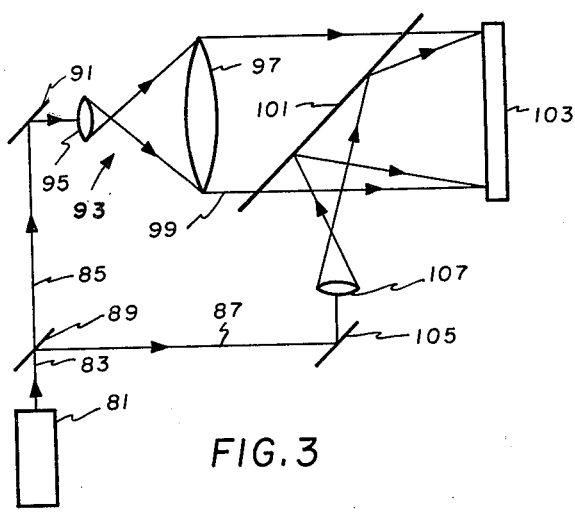
FIG. 3 is a schematic representation of a method and means for making on-axis holographic lenses.
Figure 4:
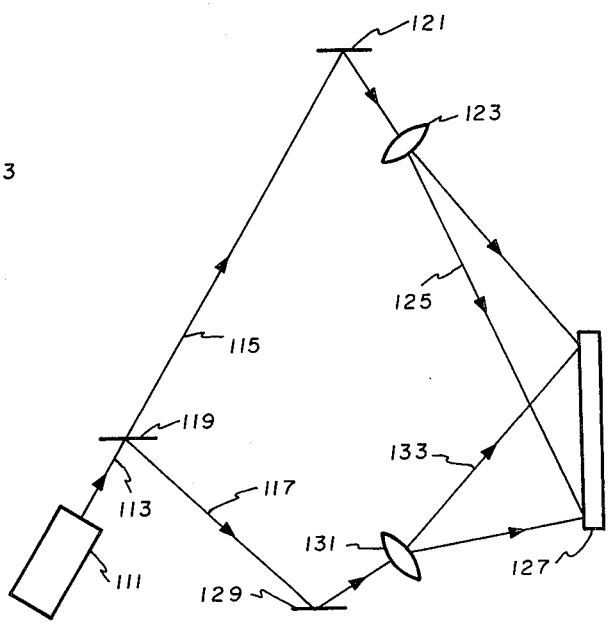
FIG. 4 is a schematic representation of a method and means for making off-axis holographic lenses.

Other ways of producing holographic lenses suitable for incorporation in the present invention are respectively illustrated in FIGS. 3 and 4.

For example, in FIG. 3 there is disclosed a method and means where the object, the center of the lens, and the image are on the same axis. In such case, a laser 81 produces monochromatic light beam 83 which is divided into two beams 85 and 87 by a half-silvered mirror 89. Beam 85 passes to another mirror 91 and is reflected through a collimator 93 composed of representative lenses 95 and 97. The resulting collimated beam 99 then passes through another half-silvered mirror 101 to a photographic plate 103. In addition, beam 87 is reflected by mirrors 89 and 105 and then passes through a lens 107 which performs the function of diverging it, after which it is then reflected from the aforesaid half-silvered mirror 101 to photographic plate 103. Thus, coherent beams of light interfere at the surface plane of photographic plate 103 from a direction normal thereto, thereby forming a definite on-axis pattern in the emulsion of said photographic plate 103. After proper conventional developing and processing, photographic plate 103 becomes a holographic lens.

FIG. 4 schematically represents how an off-axis holographic lens may be constructed. In such case, a laser 111 — such as, for example, a helium-neon laser — produces monochromatic light beam 113 which is divided into two beams 115 and 117 by a half-silvered mirror 119. Beam 115 passes to another mirror 121 and is reflected thereby, after which it passes through a divergent lens 123. The resulting diverging beam 125 then passes to a photographic plate 127. Moreover, the aforesaid beam 117 is reflected by another mirror 129 to another divergent lens 131, and after passing therethrough, becomes another diverging beam 133 which passes it to the aforementioned photographic plate 127. Thus, beams of light 125 and 133 interfere at the surface plane of photographic plate 127 from directions that are at angles therewith, respectively, which are not normal thereto, thereby forming a definite off-axis pattern in the emulsion thereof. Again, proper conventional developing and processing of photographic plate 127 after it has been so exposed results in a holographic lens suitable for being incorporated as one or more lenses in the instant invention.

At this time, it would ostensively be noteworthy that, among others, the aforementioned photographic plates 103 and 127 may be of the Kodak 649F film or plate types which may be purchased commercially from the Eastman Kodak Company of Rochester, N.Y., and then developed and processed as such photographic plates are ordinarily developed to make negatives which are then called holographic lenses.

Figure 5:
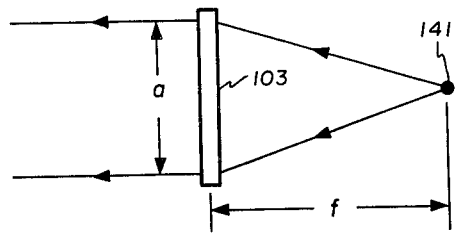
FIG. 5 is an optical ray diagram showing how a holographic lens made in accordance with the procedures depicted in FIG. 3 may be used.

FIG. 5 illustrates how an on-axis lens — such as lens 103 constructed in the manner depicted in FIG. 3 — may be used. Thus, for instance, if an object is positioned at focal point 141, the image thereof will be collimated by lens 103, thereby making it presentable for viewing by an observer. In this case, distance "$f$" represents the focal length of lens 103 and "$a$" the aperture thereof. All on-axis lenses of the microscopes of FIGS. 1 and 2 are used in such manner.

Figure 6:
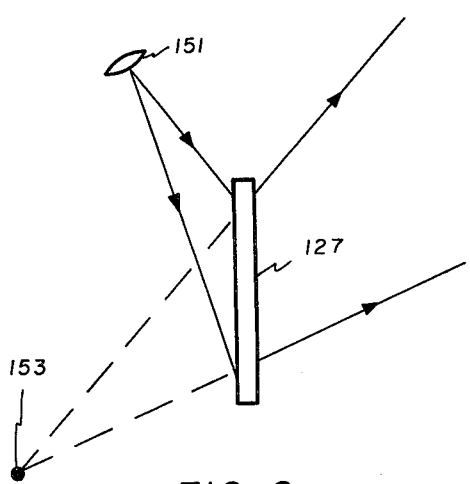
FIGS. 6 and 7 depict typical uses of off-axis holographic lenses of the type made by the new method and means of FIG. 4.

In FIG. 6, lens 127, constructed in the manner shown in FIG. 4, is disclosed as transmitting the magnified virtual image of an object 151 to an observer as if said object were located at apparent location 153. Thus, it may readily be seen that lens 127 acts as a redirecting and magnifying lens which may be used as off-axis lenses 29 and 59 of the microscopes of FIGS. 1 and 2, respectively.

Figure 7:
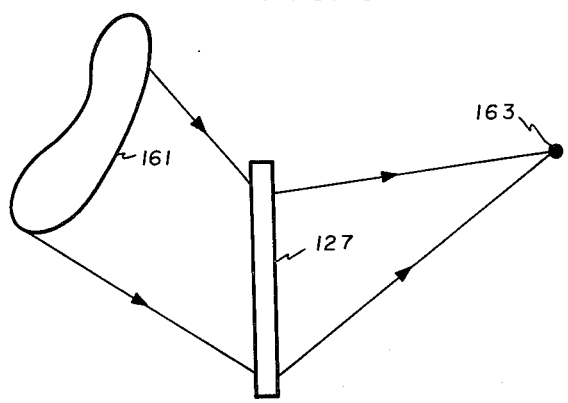

FIG. 7 merely teaches that a lens of the type constructed by means of the procedure shown in FIG. 4 is quite versatile and may be used to focus the image of an object 161 as a real image at focal point 163. Of course, such focusing and redirecting of image 161 occurs due to the diffraction characteristics designed into lens 127 in the first place.

Figure 8:
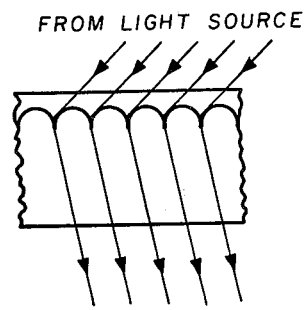
FIG. 8 is an end view of a typical holographic lens showing how light energy may be diffracted therethrough.

Referring now to FIG. 8, an idealistic, imaginary representation of a cross-section of a holographic lens is shown along with representative diffractions and magnifications of light rays therethrough. Hence, it may be seen that light rays from a light source — be it from a lamp or a sample object desired to be observed in highly magnified form — pass therethrough and are diffracted and magnified as they impact and reflect from the particular developed diffraction pattern in the holographic lens involved in a manner similar to that discussed theoretically and practically in U.S. Pat. No. 3,506,327, entitled Wavefront Reconstruction Using a Coherent Reference Beam, by E. N. Leith et al.

From the foregoing, it would appear that high magnification of an object may be obtained by using a plurality of properly constructed and disposed holographic lenses, including those made in the manner mentioned above or those made with the conventional dichromated gelatin process, such that they are clear (non-absorbing) and highly efficient (because most of the light is directed in the proper direction). Of course, it should be understood — and ostensively be readily apparent to the artisan — that the individual holographic lenses of the subject microscope may be — and most likely would be — multiple element lenses composed of two or more holographic lens elements made in the manner described above and compounded to give the optical results desired, inasmuch as so doing would tend to optimize the microscope constituting the subject invention for any given operation circumstance.

Mode of Operation

The operation of the invention will now be discussed very briefly in conjunction with FIGS. 1 and 2.

Considering the new and improved microscope of FIG. 1 first, lamp 13 provides the illumination of semi-transparent sample 19 by means of holographic condenser lens 15 while said sample 19 is mounted on and supported by transparent stage 17. A portion of the light from condenser lens 15 passes through and from sample 19 to holographic objective lens 21 from whence it is projected to holographic zoom lens system 23 which, in turn, provides for the manual adjustment of the overall magnification of the microscope. From zoom lens system 23, the light passes to off-axis, single-channel, holographic lens 29 which redirects it, magnifies it, and images it to eyepiece 31. Eyepiece 31 collimates the received image from lens 29 and then passes it on to both eyes of observer 33 at the same time (in other words, a biocular system). Thus, observer 33 sees a substantially three-dimensional view of magnified sample 19 without use of any binocular optical system and, furthermore, may view it from various directions merely by repositioning his head.

The microscope of FIG. 2 operates in the same manner as that of FIG. 1 from light source 43 through zoom lens system 53. However, the image of sample 49 is then passed through holographic, multichannel, off-axis, redirector, and magnifier lens 59 where it is magnified and directed angularly as necessary to pass through and be collimated by eyepieces 61, 63, 65, and 67 before being viewed by two-eyed observers 69, 71, 73, and 75, respectively.

From the above, it would appear to be noteworthy that numerous differences exist between the subject invention and the devices of the prior art, and that most of the differences therebetween make the subject invention susceptible to having special features and elements easily, rapidly, and economically built or inserted as modules therein in-house, thereby tremendously increasing the applications of any given instrument.

Obviously, many modifications and variations of the present invention are possible in light of the above teachings. It is, therefore, to be understood that within the scope of the appended claims the invention may be practiced otherwise than as specifically described.

What is claimed is:

1. In a microscope having a predetermined radiant energy path therethrough:
   means for generating and broadcasting a predetermined radiant energy;
   transparent means spatially disposed from said predetermined radiant energy generating and broadcasting means for supporting an object to be viewed in magnified form on the aforesaid predetermined radiant energy path;
   means spatially disposed between said transparent supporting means and the aforesaid radiant energy generating and broadcasting means for condensing a portion of the radiant energy generated thereby and for passing it along said predetermined radiant energy path and through said transparent supporting means and the object to be viewed in magnified form supported thereby;
   objective lens means spatially disposed from said radiant energy condensing means, the aforesaid transparent supporting means, and on the aforesaid predetermined radiant energy path;
   an off-axis, redirector, and magnifier holographic lens means spatially disposed from said objective lens means and on the path of the radiant energy that has been passed through the object to be viewed in magnified form for effectively and simultaneously redirecting and magnifying the radiant energy passed therethrough as a magnified image thereof; and
   biocular eyepiece lens means spatially disposed from said off-axis, redirector, and magnifier holographic lens means for receiving and collimating the aforesaid redirected and magnified object image in such manner that it may be viewed simultaneously by a plurality of sensors responsive to the aforesaid predetermined radiant energy.

2. The device of claim 1, wherein said means for generating and broadcasting a predetermined radiant energy comprises a light source.

3. The device of claim 1, wherein said transparent means spatially disposed from said predetermined radiant energy generating and broadcasting means for supporting an object to be viewed in magnified form along the aforesaid predetermined radiant energy path comprises a transparent stage capable of being adjustably moved along the aforesaid predetermined radiant energy path.

4. The device of claim 1, wherein said means spatially disposed between said transparent supporting means and the aforesaid radiant energy generating and broadcasting means for condensing a portion of the radiant energy generated and broadcast thereby and for passing it along said predetermined radiant energy path and through said transparent supporting means and the object to be viewed in magnified form supported thereby comprises a holographic condensor lens.

5. The device of claim 1, wherein said objective lens means spatially disposed from said radiant energy condensing means and on the aforesaid predetermined radiant energy path comprises a holographic objective lens.

6. The device of claim 1, wherein said off-axis, redirector, and magnifier holographic lens means spatially disposed from said objective lens means and on the path of the radiant energy that has been passed through the object to be viewed in magnified form for effectively and simultaneously redirecting and magnifying the radiant energy passed therethrough as a magnified image thereof comprises a single-channel, off-axis, redirector and magnifier holographic lens, the plane of which angularly intersects said radiant energy path and has a predetermined angular disposition with respect to the plane of the aforesaid objective lens means which effectively excludes all diffraction orders thereof except one.

7. The device of claim 1, wherein said off-axis, redirector, and magnifier holographic lens means spatially disposed from said objective lens means and on the path of the radiant energy that has been passed through the object to be viewed in magnified form for effectively and simultaneously redirecting and magnifying the radiant energy passed therethrough as a magnified image thereof comprises a multi-channel, off-axis, redirector and magnifier holographic lens having a predetermined plurality of diffraction gratings superimposed upon each other, the plane of which angularly intersects said radiant energy path and is disposed in parallel with the plane of the aforesaid objective lens means.

8. The device of claim 1, wherein said off-axis, redirector, and magnifier holographic lens means spatially disposed from said objective lens means and on the path of the radiant energy that has been passed through the object to be viewed in magnified form for effectively and simultaneously redirecting and magnifying the radiant energy passed therethrough as a magnified image thereof comprises an off-axis, redirector, and magnifier holographic lens, the plane of which angularly intersects said radiant energy path, having a focal length equal to $-7.7$ millimeters and an aperture of 5 millimeters.

9. The device of claim 1, wherein said eyepiece means spatially disposed from said holographic redirecting and magnifying means for receiving and collimating the aforesaid redirected and magnified object image in such manner that it may be viewed simultaneously by a plurality of sensors responsive to the aforesaid predetermined radiant energy comprises a holographic lens.

10. The device of claim 1, wherein said plurality of sensors responsive to the aforesaid predetermined radiant energy comprises the eyes of a human being and the radiant energy to which they are responsive is light falling within the visible spectrum.

11. The device of claim 1, wherein said plurality of sensors responsive to the aforesaid predetermined radiant energy comprises the eyes of a plurality of human beings and the radiant energy to which they are responsive is light falling within the visible spectrum.

12. The invention of claim 1, further characterized by a zoom lens system spatially disposed between said objective lens means and the aforesaid holographic redirecting and magnifying lens means.

13. The invention of claim 12, wherein said zoom lens system comprises:
   a first lens disposed in fixed position on the aforesaid predetermined radiant energy path; and
   a second lens manually adjustable for movement along the aforesaid predetermined radiant energy path with respect to said first lens.

14. The invention of claim 12, wherein said zoom lens system comprises a plurality of relatively movable holographic lenses, each of which is disposed on the aforesaid radiant energy path.

15. The device of claim 1, wherein said biocular eyepiece lens means spatially disposed from said off-axis, redirector, and magnifier holographic lens means for receiving and collimating the aforesaid redirected and magnified object image in such a manner that it may be viewed simultaneously by a plurality of sensors responsive to the aforesaid predetermined radiant energy comprises a predetermined plurality of biocular holographic lenses.

16. In a microscope, a lens system having an observation axis, comprising in combination:
   a light source located on the aforesaid observation axis;
   a holographic condensor lens spatially disposed from said light source and located on the aforesaid observation axis;
   a transparent stage spatially disposed from the side of said holographic condensor lens that is opposite said light source and located on the aforesaid observation axis, said transparent stage being adapted for having an object to be viewed in magnified form mounted thereon;
   a holographic objective lens spatially disposed from that side of said transparent stage that is opposite said holographic condensor lens and located on the aforesaid observation axis;
   zoom lens means, including a fixed holographic lens spatially disposed from that side of said holographic objective lens that is opposite said transparent stage and located on the aforesaid observation axis, and an adjustably movable holographic lens spatially disposed from that side of said fixed holographic lens that is opposite said holographic objective lens and located on the aforesaid observation axis;
   an off-axis, redirector, and magnifier holographic lens spatially disposed on that side of the movable holographic lens of said zoom lens means that is opposite the fixed holographic lens of said zoom lens means and located on the aforesaid observation axis;

a biocular holographic eyepiece lens spatially disposed on that side of said off-axis, redirector, and magnifier holographic lens that is opposite the adjustably movable holographic lens of said zoom lens means and located off the aforesaid observation axis, said holographic eyepiece lens being of such dimensions that the side thereof opposite the side adjacent to said off-axis, redirector, and magnifier holographic lens will simultaneously accomodate both eyes of a human being observing the magnified image of the object mounted on said transparent stage.

17. The lens system of claim 16, wherein said light source comprises a monochromatic lamp.

18. The lens system of claim 16, wherein said holographic condensor lens has a focal length of 20 millimeters and an aperture of 18 millimeters.

19. The lens system of claim 16, wherein said holographic objective lens has a focal length of 10 millimeters and an aperture of 9 millimeters.

20. The lens system of claim 16, wherein the fixed holographic lens of said zoom lens means has a focal length of 83.2 millimeters and an aperture of 10 millimeters.

21. The lens system of claim 16, wherein the movable holographic lens of said zoom lens system has a focal length of minus 28 millimeters and an aperture of 10 millimeters.

22. The lens system of claim 16, wherein said off-axis, redirector, and magnifier holographic lens has a focal length of −7.7 millimeters and an aperture of 5 millimeters.

23. The lens system of claim 16, wherein said biocular holographic eyepiece lens has a focal length of 148 millimeters and an aperture of 100 millimeters.

24. The lens system of claim 16, wherein said off-axis, redirector, and magnifier holographic lens comprises a single-channel, off-axis, redirector, and magnifier holographic lens.

25. The lens system of claim 16, wherein said off-axis, redirector, and magnifier holographic lens comprises a multichannel, off-axis, redirector, and magnifier holographic lens.

26. The invention of claim 25, further characterized by a plurality of biocular holographic eyepiece lenses, including the aforesaid biocular holographic eyepiece lens, disposed in such manner with respect to the channels of said multi-channel, off-axis, redirector, and magnifier holographic lens that each thereof, including the aforesaid biocular holographic eyepiece lens, is capable of receiving and projecting the magnified image of the object mounted on said transparent stage.

* * * * *